United States Patent [19]

Nava

[11] Patent Number: 5,780,195
[45] Date of Patent: Jul. 14, 1998

[54] TONER RESIN COMPOSITIONS

[75] Inventor: Hildeberto Nava, Cary, N.C.

[73] Assignee: Reichhold Chemicals, Inc., Durham, N.C.

[21] Appl. No.: 664,853

[22] Filed: Jun. 17, 1996

[51] Int. Cl.$^6$ .............. C03G 9/00; C03G 63/00; C08G 63/00; C08F 20/00; C08K 5/49

[52] U.S. Cl. .............. 430/110; 528/176; 528/193; 528/194; 528/195; 528/219; 528/296; 528/300; 528/301; 528/302; 528/308; 528/308.6; 525/438; 525/440; 525/472; 524/115; 524/123; 524/126; 524/186; 430/137; 430/904; 430/908

[58] Field of Search .............. 528/176, 193, 528/194, 195, 219, 296, 300, 301, 302, 308, 308.6; 525/438, 440, 472; 524/115, 123, 126, 186; 430/110, 137, 904, 908

[56] References Cited

U.S. PATENT DOCUMENTS

| | | | |
|---|---|---|---|
| 5,057,392 | 10/1991 | McCabe et al. | 430/109 |
| 5,112,715 | 5/1992 | DeMejo et al. | 430/109 |

*Primary Examiner*—Samuel A. Acquah
*Attorney, Agent, or Firm*—Myers, Bigel, Sibley & Sajovec, PA

[57] ABSTRACT

A toner resin composition and a method of making the same are disclosed. The toner resin composition comprises a polyester resin formed from a reaction between a polybasic acid or anhydride and a polyhydric alcohol, and a polyfunctional epoxy resin which is crosslinked to the polyester resin. The crosslinking is effected in the presence of a catalyst.

35 Claims, No Drawings

TONER RESIN COMPOSITIONS

FIELD OF THE INVENTION

The present invention relates to a toner resin composition and a method of making the same. More particularly, the present invention relates to a toner resin compositions formed of a polyester cross-linked to a polyfunctional epoxy.

BACKGROUND OF THE INVENTION

In typical dry-type electrophotographic processes, latent electrostatic images formed on a photoconductor are developed by means of a triboelectrically charged toner. Specifically, when an image is formed by a photographic copying machine, a surface of a roller composed of a photoconductive and photosensitive material is charged. An electrostatic latent image is formed by exposure to the light reflected from the surface of an original to be copied. The latent image is developed by a toner, with the formed visible image being transferred to a paper or the like. The transferred image is fixed on the paper by compression under heating, and thus a copy print is obtained.

A typical toner includes several components including a toner resin, a colorant, and an electrostatic carrier material. The toner resin is of particular importance in that it serves to bind the other toner components. Typically, toner resins are formed from various materials such as bisphenol-epoxy resins described in U.S. Pat. Nos. 5,061,588 to Fushimi et al.; silicone-based resins as described in 5,089,547 to McCabe et al.; and styrene-butadiene copolymer resins as described in 5,324,611 to Fuller et al. Inspite of the above processes, there remains a need in the art to obtain a toner resin having properties for improved performance in high speed copying operations. In particular, it is often problematic when carrying out an image-forming process at high speeds as to how to increase the speed of fixing a toner image followed by visualizing an electrostatic latent image to the surface of the recording material. Toner resins which are believed to be suitable for such high speed processes should melt sharply at relatively low temperatures, possess good stability, and blend well with colorant. Additionally, such toner resins should not develop significant blocking or caking at ambient temperatures and should be easy to pulverize.

Moreover, there remains a need in the art to produce such resins at faster reaction rates. This would be particularly desirable in order to achieve increased resin productivity and greater process efficiency.

It is therefore an object of the present invention to provide a toner resin composition which possesses the above desirable physical properties.

It is also an object of the present invention to provide a toner resin composition which is produced under increased reaction rates.

SUMMARY OF THE INVENTION

To this end and others, the present invention provides a toner resin composition which exhibits desirable properties, especially at high copying speeds, and is produced at faster reaction rates. Specifically, the toner resin composition includes a polyester resin formed from a reaction between a polybasic acid or anhydride and a polyhydric alcohol, and a polyfunctional epoxy resin which is crosslinked to the polyester resin. A catalyst is employed to crosslink the polyester resin to the polyfunctional epoxy resin. For the purposes of the invention, "crosslinking" refers to the formation of insoluble and infusible polymers in which chains are joined together to form a three-dimensional network structure.

In a preferred embodiment, the catalyst is selected from the group consisting of triphenyl phosphine, tetraphenylphosphonium bromide, ethyl triphenylphosphonium bromide, tetraphenyl phosphonium chloride, tetrabutyl phosphonium bromide, tetrabutyl phosphonium chloride, tetraethyl phosphonium bromide, tetraethyl phosphonium chloride, imidazoles, benzotriazoles, benzyltriethyl ammonium bromide, benzyltriethylammonium chloride, triethyl ammonium bromide, triethyl ammonium chloride, tributylammonium bromide, tributylammonium chloride, quaternary ammonium salts, and mixtures thereof.

The present invention also provides a toner developing composition. The toner developing composition comprises a toner resin composition and a carrier material.

The present invention is also related to a process for making a toner resin composition. Specifically, the process comprises providing a polyester resin, a polyfunctional epoxy resin, and a catalyst which serves to crosslink the polyester resin and the polyfunctional epoxy resin; and reacting the polyester resin and the polyfunctional epoxy resin in the presence of the catalyst such that the polyester resin and the polyfunctional epoxy resin become crosslinked. As a result, the toner resin composition is formed.

In a preferred embodiment, the steps of providing and reacting the polyester and the polyfunctional epoxy resins occur in a extruder. In such an embodiment, the process further comprises discharging the toner resin composition from the extruder.

DETAILED DESCRIPTION OF THE PREFERRED EMBODIMENT

The present invention will now be described in more fully hereinafter. This invention may, however, be embodied in many different forms and should not be construed as limiting to the embodiment set forth herein; rather, this embodiment is provided so that this disclosure will be thorough and complete, and will fully convey the scope of the invention to those skilled in the art.

As summarized above, the present invention relates to a toner resin composition which includes a polyester resin and a polyfunctional epoxy component crosslinked to the polyester resin. A catalyst serves to crosslink the polyester and the polyfunctional epoxy component. For the purposes of the invention, the "crosslinking" of the polyester and polyfunctional epoxy component refers to the formation of insoluble and infusible polymers in which chains are joined together to form a three-dimensional network structure.

Preferably, branched polyester resins are utilized for the purposes of the invention, although linear polyesters may also be employed. The degree of branching in the polyester may be determined according to any known method and is typically determined by H-NMR analysis. A branched polyester resin may be formed in accordance with any suitable process and utilizing known components. For example, a branched polyester may be formed from a reaction between a diol component; an alcohol which is trihydric or of higher functionality; a dicarboxylic acid, or an anhydride or an alkyl ester thereof; and a polybasic acid having at least three carboxyl groups, or an anhydride or a lower alkyl ester thereof. For the purposes of the invention, the branched polyester resin preferably contains alkoxy succinate segments. In this instance, the branched polyester containing the alkoxy succinate segments may be formed via the reactions of the hydroxyl groups of polyols such as propylene glycol; polyoxypropylene (2.2)-2.2-bis(4-hydroxy phenyl)propane; polyoxypropylene (3.3)-2.2-bis-(4-hydroxy phenyl)propane; and the like; with the unsaturated segments derived from maleic acid and fumaric acid.

The polyester resin is preferably employed in an amount of from about 50 to 99 percent based on the weight of the toner resin, more preferably from about 60 to 95 percent by weight, and most preferably from about 70 to 95 percent by weight.

The polyester resin of the preferably has a glass transition point ($T_g$) ranging from 50° C. to 95° C., and more preferably from 55° C. to 70° C. The preferred weight average molecular weight (Mw) for the polyester resin ranges from 5000 to 20,000. The polyester resin also preferably has a viscosity ranging from $10^4$ to $10^6$ poise, measured by suitable techniques at 150° C. The polyester resin preferably has a softening point ranging from 90° C. to 150° C.

The polyester resin is typically formed from the reaction between a polybasic acid or anhydride and a polyhydric alcohol. Known and suitable processes for preparing such polyesters are described in U.S. Pat. Nos. 3,787,526; 4,588,668; 4,933,252; 4,939,059; 4,960,664; and 5,241,019; along with Canadian Patent No. 1,032,804. The disclosures of these references are incorporated herein by reference in their entirety.

Suitable polybasic acids or anhydrides thereof include dicarboxylic acids such as, but not limited to, maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azealic acid, malonic acid, alkenyl succinic acids such as n-dodecenylsuccinic acid, dodecylcucinic acid and octadecenylsuccinic acid, and mixtures thereof. Lower alkyl esters of any of the above may also be employed.

Additionally, polybasic acids or anhydrides thereof having not less than three carboxylic acid groups may be employed. Such compounds include 1,2,4-berzenetricarboxylic acid, 1,3,5-benzene tricarboxylic acid, 1,2,4-cyclohexane tricarboxylic acid, 2,5,7-naphthalenetricarboxylic acid, 1,2,4-naphthalenetricarboxylic acid, 1,3,4-butane tri carboxylic acid, 1,2,5-hexanetricarboxylic acid, 1,3-dicarboxy-2-2-methyl-2-methylcarboxypropane, 1,3-dicarboxy-2-methyl-2-carboxymethylpropane, tetra(carboxymethyl)methane, 1,2,7,8-octane tetracarboxylic acid, and mixtures thereof.

The polybasic acid or anhydride may be employed in any suitable amount, preferably of from about 30 to 50 percent based on the weight of the polyester resin.

Any of the polyhydric alcohols which are appropriate in polyester-forming reactions are utilized. Such compounds include, but are not limited to, any suitable glycols. "Glycols" refers to glycol compounds and bisphenols. Suitable glycol compounds include, for example, ethylene glycol, diethylene glycol, neopentyl glycol, dipropylene glycol, and polytetramethylene glycol. Suitable bisphenols include, for example, bispolyoxypropylene (2.2)-2.2-bis(4-hydroxyphenyl)propane, polyoxypropylene (3.3)-2.2-bis(4-hydroxyphenyl) propane, polyoxy ethylene(2.0)-2.2-bis(4-hydroxyphenyl)propane, polyoxypropylene(2.0)-polyoxyethylene(2.0)-2.2-bis(4-hydroxyphenyl)propane, and polyoxypropylene(6)-2.2-bis(4-hydroxyphenyl) propane. Diols may be employed such as, for example, 1,5-pentanediol, 1,4-butanediol, 1,6-hexanediol, 1,4-cyclohexanediol, and 1,4-cyclohexanedimethanol. Mixtures of any of the above compounds may be used.

Polyhydric alcohols that are suitable as branching agents may be used and include, for example, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methyl propanetriol, 2-methyl 1,2,4-butanetriol, trimethylol ethane, trimethylol propane, 1,3,5-trihydroxyethyl benzene, and mixtures thereof.

The polyhydric alcohols may be employed in any suitable amount, preferably of from about 35 to 65 percent based on the weight of the polyester.

Known and appropriate esterification catalysts may be employed in the reaction between the polybasic acid or anhydride and polyhydric alcohol. As an example, esterification catalysts may include organotin oxides and titanates such as stannous oxide, dibutyl tin oxide, dibutyl tin bis (ethylhexanoate), titanium isoproproxide, titanium ethoxide, and mixtures thereof. The catalysts may be employed in any suitable amount, preferably of from about 0.005 to 0.100 percent based on the weight of the polyester resin.

For the purposes of the invention, the polyfunctional epoxy resins which may be employed are known and include virtually any reaction product of a polyfunctional halohydrin, such as epichlorohydrin, with a phenol or polyhydric phenol. Suitable phenols or polyhydric phenols include, for example, resorcinol, tetraphenol ethane, and various bisphenols such as Bisphenol-A, 4,4'-dihydroxydiphenylsulfone, 4,4'-dihydroxy biphenyl, 4,4'-dihydroxydiphenylmethane, 2,2'-dihydroxydiphenyloxide, and the like. Other bisphenol type epoxy resins which may be used are glycidyl ethers and β-methyl glycidyl ethers of bis(4-hydroxyphenyl)methane (Bisphenol F); 1,1-bis(4-hydroxyphenyl)ethane (Bisphenol AD), and the like. Mixtures of any of the above may be employed.

Specific bisphenol epoxy resins which can be employed in the toner resin composition may be represented by the formula:

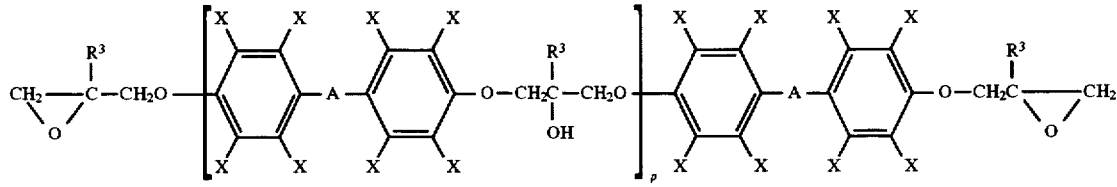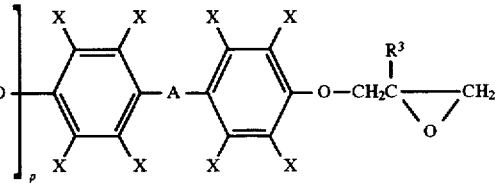

wherein

X is H or a halogen such as bromine or chlorine;

A is an alkylene radical having from 1 to 2 carbon atoms or a divalent organic group selected from the group consisting of:

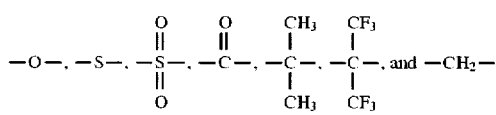

$R^3$ is H, —CN, or an alkyl from 1 to 4 carbon atoms; and p ranges from 0 to 15.

The polyfunctional epoxy resin may also be selected from any of the appropriate epoxy novalac resins. The term "epoxy novolac resin" as used herein means an epoxy resin made by the reaction of epichlorohydrin with a novolac resin. An epoxy novolac resin has the pendant repeating epoxide structure:

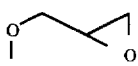

A novolac resin is a condensate of a phenol compound with formaldehyde that is prepared in the presence of acid catalysts. The phenol compound can be phenol itself, or such compounds as the cresols, xylenols, resorcinol, naphthols, and the like. Epoxy novolac resins used may have epoxy functionalities which are typically in the range of about 2.5 to about 6. Specific examples of novolac epoxy resins may include those represented by the formula:

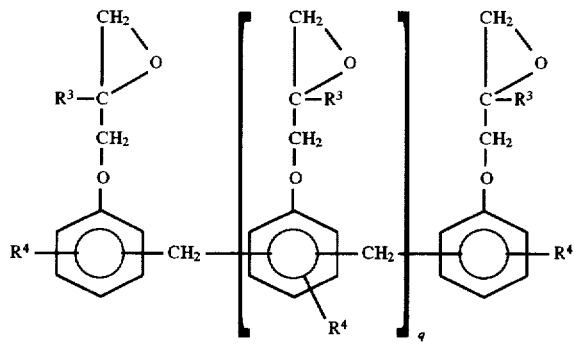

wherein $R^3$ is H, —CN, or an alkyl from 1 to 4 carbon atoms;

$R^4$ is H or an alkyl group; and q ranges from 1 to 15.

Other polyfunctional epoxy resins which may be employed include isocyanurates such as, for example, triglycidyl isocyanurate.

The polyfunctional epoxy resin may be employed in any appropriate amount. Preferably, the epoxy resin is used in an amount of from about 0.1 to 50 percent based on the weight of the resin composition, more preferably, from about 0.5 to 40 weight percent, and most preferably from about 2 to 30 weight percent.

In accordance with the invention, a catalyst is employed to facilitate the crosslinking of the polyester resin to the polyfunctional epoxy resin. Any of the known and appropriate catalysts may be used for this purpose including, for example, triphenyl phosphine, tetraphenylphosphonium bromide, ethyl triphenylphosphonium bromide, tetraphenyl phosphonium chloride, tetrabutyl phosphonium bromide, tetrabutyl phosphonium chloride, tetraethyl phosphonium bromide, tetraethyl phosphonium chloride, imidazoles, and benzotriazoles; along with ammonium salts such as benzyltriethyl ammonium bromide, benzyltriethylammonium chloride, triethyl ammonium bromide, triethyl ammonium chloride, tributylammonium bromide, tributylammonium chloride, and the like. Other quaternary ammonium salts may also be used. Triphenyl phosphine is the preferred catalyst. Mixtures of any of the above catalysts may be employed.

The catalyst is preferably employed in an amount ranging from 0 to 5 percent based on the weight of the resin. More preferably, the catalyst is employed from about 0.1 to 1.0 weight percent, and most preferably, from about 0.3 to 0.5 weight percent.

In addition to the polyester and polyfunctional epoxy resins, the toner resin composition may include other known and suitable components. Particularly suitable are polymers and copolymers of aliphatic conjugated dienes, non-aromatic unsaturated mono- or dicarboxylic ester monomers, and/or aromatic unsaturated monomers. A preferred additional component is a styrene-methyl methacrylate-glycidyl methacrylate copolymer. Vinyl ester resins may also be employed. A linear polyester resin may also be used as an additional component.

Suitable aliphatic conjugated dienes are $C_4$ to $C_9$ dienes and include, for example, butadiene monomers such as 1,3-butadiene, 2-methyl-1,3-butadiene, 2 chloro-1,3-butadiene, and the like. Blends of the diene monomers can also be used. The aliphatic conjugated diene monomer may be used in any appropriate amount. Preferably, the monomer ranges from about 3 to 15 percent based on the weight of the polymer or copolymer.

Suitable non-aromatic unsaturated monocarboxylic ester monomers which may be used in the copolymer include acrylates and methacrylates. The acrylates and methacrylates may include functional groups such as amino groups, hydroxy groups, epoxy groups and the like. Exemplary acrylates and methacrylates include methyl acrylate, methyl methacrylate, ethyl acrylate, ethyl methacrylate, butyl acrylate, butyl methacrylate, 2-ethylhexyl acrylate, glycidyl acrylate, glycidyl methacrylate, hydroxyethyl acrylate, hydroxyethyl methacrylate, hydroxypropyl acrylate, hydroxypropyl methacrylate, isobutyl methacrylate, hydroxybutyl acrylate, hydroxybutyl methacrylate, 3-chloro-2-hydroxybutyl methacrylate, n-propyl methacrylate and the like. Exemplary amino-functional methacrylates include t-butylamino ethyl methacrylate and dimethylamino ethyl methacrylate. Suitable non-aromatic dicarboxylic ester monomers are alkyl and dialkyl fumarates, itaconates and maleates, with the alkyl group having one to eight carbons, with or without functional groups. Specific monomers include diethyl and dimethyl fumarates, itaconates and maleates. Other suitable non-aromatic dicarboxylic ester monomers include di(ethylene glycol) maleate, di(ethylene glycol) itaconate, bis(2-hydroxyethyl) maleate, 2-hydroxyethyl methyl fumarate, and the like. The non-aromatic unsaturated monocarboxylic ester monomer may be used in any appropriate amount. Preferably, the monomer ranges from about 10 to 80 percent based on the weight of the polymer or copolymer.

Suitable aromatic unsaturated monomers may be employed and include, for example, styrene and styrene derivatives such as alphamethylstyrene, p-methyl styrene, divinyl benzene, vinyltoluene, divinyl toluene, ethylstyrene, tert-butyl styrene, monochlorostyrene, dichlorostyrene, vinyl benzyl chloride, fluorostyrene, alkoxystyrenes (e.g., paramethoxystyrene) and the like. The aromatic unsaturated monomer may be used in any appropriate amount. Preferably, the monomer ranges from about 20 to 75 percent based on the weight of the polymer or copolymer.

Any suitable vinyl ester resin may be used in the toner resin composition. The vinyl ester resins employed in the invention typically include the reaction product of an unsaturated monocarboxylic acid or anhydride with an epoxy resin. The unsaturated monocarboxylic acid or anhydride and epoxy resins include those which are suitable such as those described herein. The toner resin composition may include various percentages of vinyl ester resin, typically between about 20 to 30 percent by weight of the vinyl ester resin.

Additional additives known by the skilled artisan may be employed in the toner resin composition of the present invention including, for example, inhibitors, paraffins, lubricants, and shrink-reducing additives. Any of the various suitable percentages of these additives can be used in conjunction with the toner resin composition.

The toner resin composition typically includes a colorant. Suitable colorants that may be employed include all those which are known and appropriate. Exemplary colorants include a red pigment (e.g., red iron oxide, cadmium red, red lead oxide, cadmium, mercury sulfide, permanent red 4R, lithol red, pyrazolone red, watchung red, calcium salt, lake red D, brilliant carmine 6B, eosine lake, rhodamine lake B, alizalin lake, brilliant carmine 3B, or the like); a green pigment (e.g., chrome green, chrome oxide green, pigment green B, malachite green lake, fanal yellow green G, or the like); a blue pigment (e.g., prussian blue, cobalt blue, alkali blue lake, victoria blue lake, phthalocyanine blue, metal-free phthalocyanine blue, phthalocyanine blue particle chlorine compound, fast sky blue, indanthrene blue BC, or the like); a magenta pigment (e.g., manganese violet, fast violet B, methyl violet lake, or the like); a yellow pigment (e.g., chrome yellow, zinc yellow, cadmium yellow, yellow oxide, mineral fast yellow, nickel titanium yellow, nables yellow, naphthol yellow S, hansa yellow G, hansa yellow 10G, benzidine yellow G, benzidine yellow GR, quinoline yellow lake, permanent yellow, NCG, tartrazine lake, or the like); an orange pigment (e.g., chrome orange, molybdenum orange, permanent orange GTR, indanthrene brilliant orange RK, vulcan orange, pyrazolone orange benzidine orange G, indanthrene brilliant orange GK, or the like); or a black pigment (e.g., carbon black, acetylene black, lamp black, aniline black, or the like). Suitable colorants are also disclosed in U.S. Pat. No. 3,989,648 to Lenhard et al. and U.S. Pat. No. 5,162,187 to Lyons et al., the disclosures of which are incorporated herein by reference in their entirety. Mixtures of any of the colorants may be used. The toner resin composition preferably includes from about 1 to 20 percent by weight of colorant.

The toner resin composition can also include a charge control agent such as Nigrosine Base EX (available from Orient Kagaku K.K.); quaternary ammonium salt (P-51: available from Orient Kagaku K.K.); Nigrosine Bontron N-01 (available from Orient Kagaku K.K.); Sudatiefschwarz BB (Solvent Black 3, C.I. 26150), Fettschwarz HEN (C.I. No. 26150); Brillantspiritschwarz TN (available from Farben Fabriken Bayer A. G.); Zapanschwarz X (available from Farberke Hechist A. G.); and an alkoxylated amine, alkyl amide, molybdic chelating agent and the like. Mixtures of any of the charge control agents may be used. Preferably, the toner resin composition includes about 1 to 5 weight percent of charge control agent.

The invention also relates to a toner developing composition. In general, the toner developing composition includes the toner resin composition described herein and a carrier material, with the toner developing composition being made by any appropriate process. Any known and suitable components may be employed as the carrier material. Such components are described, but are not limited to, those in U.S. Pat. Nos. 5,422,216; 4,898,801; 4,855,205; 5,004,665; 3,590,000; 5,162,187; 2,846,333; 3,929,657; and 4,127,667, the disclosures of which are incorporated by reference herein in their entirety. The carrier materials may be made by any known and suitable processes. In general, the carrier material may be used in any appropriate mode such as, for example, a binder-type (micro) carrier, a magnetic particle-coated carrier, a toner resin particle-coated carrier, and the like. Any known and suitable materials may be used including, for example, metals such as iron, nickel, cobalt, and the like, an alloy or a mixture of these metals such as zinc, antimony, aluminum, lead, tin, bismuth, beryllium, manganese, selenium, tungsten, zirconium, vanadium, and the like. Metallic oxides may be used such as, for example, iron oxide, titanium oxide, and magnesium oxide, along with nitrides such as chromium nitride, vanadium nitride, and the like. Carbides such as silicon carbide, tungsten carbide may be utilized, along with a ferromagnetic ferrite. Mixtures and alloys of any of the above may be used as the carrier material. Preferably, the carrier material is employed in particles having a typical average diameter ranging from 20 to 100 μm. Any amount of carrier material may be used in the toner developing composition. Preferably, the amount of carrier material employed ranges from about 0.5 to 10 weight percent of the toner developing composition, and more preferably from about 1 to 5 weight percent.

The carrier material optionally can be coated to stabilize its resistivity and triboelectric characteristics. For example, the carrier material can be coated with a polymer coating which includes a mixture of polymers that are not in close proximity thereto in the triboelectric series such as described in U.S. Pat. No. 4,937,166, the disclosure of which is incorporated by reference in its entirety. Specific examples include polyvinylidenefluoride with polyethylene; polymethylmethacrylate and copolyethylene vinylacetate; copolyvinylidenefluoride tetrafluoro ethylene and polyethylene; polymethylmethacrylate and copolyethylene vinylacetate; polymethylmethacrylate and polyvinylidenefluoride; polystyrene and tetra fluoroethylene; polyethylene and tetrafluoroethylene; polyethylene and polyvinyl chloride; polyvinyl acetate and polystyrene; and polyvinyl acetate and polymethyl methacrylate. Blends of any of the above may be used.

The toner developing composition may be made by any suitable technique. For example, the carrier material may be coated or blended with between about 10 to 15 weight percent of the toner resin composition. Adherence can be accomplished by any suitable means including heating, mechanical impaction, or electrostatic attraction. For example, the carrier material can be provided in the conventional manner, and a mixture of the carrier material and the toner resin composition can be heated to a temperature of about 100° C. to 250° C. for 10 to 60 minutes to melt and fuse the carrier material and toner resin composition. Subsequently, the components are cooled so as to obtain the toner developing composition.

The invention also includes a process for making the toner resin composition. The process includes providing polyester resin, a polyfunctional epoxy resin, and a catalyst which serves to crosslink the polyester resin and the polyfunctional epoxy resin. Preferably, the above process steps occur in a known and suitable extruder. As a result, the method may also include discharging the toner resin from the extruder. Additionally, the process also includes mixing the toner resin composition with a carrier material to form a toner developing composition.

Preferably, the polyester, the polyfunctional epoxy resin, and catalyst are first placed into the extruder. A commercially preferred extruder is a Model ZSK-30 extruder sold by Werner & Pfleider of Ramsay, N.J. The polyester and polyfunctional epoxy resins are melt blended. In the event that other components are incorporated into the toner resin, these are added to the extruder using known and appropriate techniques.

The extruder is heated and maintained at an appropriate temperature, preferably ranging from 130° C. to 220° C. Under these conditions, the polyester and polyfunctional epoxy react so as to become cross-linked in the presence of the catalyst and thus form the toner resin composition. The time for the reaction to take place ranges from about 10 to 300 seconds, and more preferably from about 10 to 120 seconds. The degree of crosslinking that the resin undergoes may be controlled by manipulating process conditions such as reaction time and temperature, along with the relative amounts of polyester and epoxy resins employed.

Subsequent to formation in the extruder, the toner resin is discharged typically in the form of a hot molten stream. The stream is cooled and pressed into a solid sheet by chill rolls. During this time, the toner resin is typically compressed so as to form a solid, flake-like material. After cooling and compression, the toner resin is transported for further processing like pulverizing such that the toner resin is in the form of a powder.

The present invention and its advantages over the prior art will be more fully understood and appreciated from the illustrative example which follows. It is understood that the example is for illustrative purposes only, and is not intended as being limited upon the scope of the invention. A person skilled in the applicable arts will appreciate from the example that this invention can be embodied in many different forms other than is specifically disclosed.

EXAMPLES 1 THROUGH 9

Examples 1 through 9 represent the various polyester and polyfunctional epoxy resins forming the toner resin compositions described in Examples A through AF. In the examples, melt index was measured on a melt indexer from CEAST CO., Fort Mill, S.C.

EXAMPLE 1

4,132.4 grams of polyoxypropylene (2,2)-2,2-bis (4-hydroxyphenyl)propane, 2,056.4 grams of polyxyethylene (2,2)-2,2-bis-(4-hydroxyphenyl) propane, 1,536.7 grams of terephthalic acid, and 3.7 grams of catalyst Fascat™ 4102 were reacted at 245° C. until an acid number of 4.0 was obtained. The reaction was continued by adding 665 grams of dodecenyl succinic anhydride and 835.8 grams of trimellitic anhydride. The reaction was stopped once an acid number of 24 was obtained. The product had a melt index of 29 g/10 min. at 150° C.

EXAMPLE 2

4,132.4 grams of polyoxypropylene (2,2)-2,2-bis(4-hydroxyphenyl)propane, 2,056.4 grams of polyxyethylene (2,2)-2,2-bis-(4-hydroxy phenyl)propane, 996.8 grams of terephthalic acid, and 3.7 grams of catalyst Fascat™ 4102 were reacted at 245° C. until an acid number of 4.0 was obtained. The reaction was continued by adding 1,596.0 grams of dodecenyl succinic anhydride and 749.3 grams of trimellitic anhydride. The reaction was stopped once an acid number of 17 was obtained. The product had a melt index of 0.51 g/10 min. at 150° C.

EXAMPLE 3

An unsaturated polyester was prepared from polyoxypropylene (2,2)-2,2-bis(4-hydroxyphenyl) propane/fumarate. The material has an acid number of 13, a hydroxyl number of 23, a melt index of 14 g/10 min measured at 125° C., and a $T_g$ of 58° C. The material contained some branching as determined by H-NMR. The branching is due to the presence of alkoxy succinate segments formed from the reaction of the hydroxyl groups of polyoxypropylene (2,2)-2,2-bis (4-hydroxy phenyl)propane with maleic/fumaric segments of the polyester. The resin is a solid identified by the name of FineTone® 382ES-HMW, sold by Reichhold Chemicals, Inc. of Research Triangle Park, N.C.

EXAMPLE 4

An unsaturated polyester was prepared from polyoxypropylene (2,2)-2,2-bis(4-hydroxyphenyl) propane/fumarate. The resulting material was solid and had an acid number of 21, a hydroxyl number of 39, and a melt index of 11 g/10 min. measured at 105° C. The resin has a $T_g$ of 56° C. and is essentially free of alkoxy succinate segments as determine by H-NMR. Accordingly, the resin is considered to be a linear polyester. The resin is identified as FineTone® 382-ES, sold by Reichhold Chemicals, Inc.

EXAMPLE 5

Example 5 refers to Fineclad® A-244-A which is a copolymer prepared from styrene, methyl methacrylate, hydroxypropyl methacrylate, and glycydyl methacrylate. The copolymer is made available from Dainippon Ink and Chemicals of Tokyo, Japan.

EXAMPLE 6

Example 6 refers to a modified bisphenol A fumarate polyester resin with an acid number of 13, a hydroxyl number of 37, and a melt index of 8 g/10 min determined at 105° C. The resin has a $T_g$ of 57° C. and is essentially free of alkoxy succinate groups as determined by H-NMR. The resin is identified as FineTone® 6694 sold by Reichhold Chemicals, Inc.

EXAMPLE 7

Example 7 refers to Fineclad® 8077 which is a saturated terephthalic type polyester resin with a hydroxyl number ranging from 35 to 45, an acid number ranging from of 3.5 to 5.5, a melt viscosity of 35 g/10 min measured at 125° C., and a $T_g$ of 61° C. The resin is made available from Dainippon Ink and Chemicals of Tokyo, Japan.

EXAMPLE 8

Example 8 refers to Epotuf® 37-007, which is a solid high molecular weight diglycidyl ether of bisphenol A epoxy resin. The resin has an epoxy content of 2300 and a melt index of 58 g/10 min measured at 150° C. The resin is made available from Reichhold Chemicals, Inc.

EXAMPLE 9

Example 9 refers to a copolymer prepared from butadiene, methyl methacrylate, acrylic acid, and glycydyl methacrylate. The resin has melt index of 12.6 g/10 min determined at 150° C., and a $T_g$ of 63° C. The resin is made available from Reichhold Chemicals, Inc.

EXAMPLES A THROUGH AF

Examples A through AF represent various toner resin compositions of the present invention. In general, the resins were prepared by feeding a branched polyester and a polyfunctional epoxy with a specified amount of triphenyl phosphine catalyst to a Werner & Pfleider twin screw extruder (Model ZSK-30). The materials were reacted for a period of time such that the branched polyester and polyfunctional epoxy became crosslinked.

The resin compositions and other physical data are presented in Tables 1 through 7. Examples D through H were processed at an extruder temperature of 150° C. and an extruder speed of 60 rpm. The remaining examples E through AF were processed at an extruder temperature of 150° C. and an extruder speed of 50 rpm. In these examples, $T_g$ was measured on a DSC-7 from Perkin-Elmer of Pittsburgh, Pa. using standard procedures. Rheology measurements were performed on a Carry-Med Rheometer CSL from TA Instruments of New Castle, Del. using standard procedures.

Advantageously, the toner resins of the present invention were observed as being easy to pulverize. Moreover, the resins do not exhibit blocking or caking at ambient temperatures.

TABLE 1

| Resin | Example (Weight percent) | | |
|---|---|---|---|
| | A | B | C |
| 1 | 97.0 | | |
| 2 | | 97.0 | |
| 3 | | | 98.0 |
| 5 | 3.0 | 3.0 | 2.0 |
| Melt Index (g/10 min @ 150° C.) | 2.50 | 2.10 | 57.0 |
| $T_g$, °C. | 53.0 | 55.0 | 57.0 |
| Extruder Temp., °C. | 175.0 | 175.0 | 150.0 |
| Extruder Speed, rpm. | 100.0 | 100.0 | 50.0 |

TABLE 2

| Resin | Example (weight percent) | | | | |
|---|---|---|---|---|---|
| | D | E | F | G | H |
| 3 | 97.56 | 98.04 | 96.62 | 97.09 | 96.80 |
| 5 | 1.95 | 1.47 | 2.90 | 2.43 | 2.71 |
| Triphenyl Phosphine | 0.49 | 0.49 | 0.48 | 0.48 | 0.49 |
| Melt Index, g/10 min @ 150° C. | 30.0 | 58.0 | 5.0 | 18.8 | 6.2 |
| $T_g$, °C. | 60.5 | 60.0 | 61.0 | 59.0 | 60.0 |

TABLE 3

| Resin | Example (weight percent) | | | | |
|---|---|---|---|---|---|
| | I | J | K | L | M |
| 3 | 96.41 | 95.93 | 94.0 | 92.05 | 87.21 |
| 5 | 2.62 | 2.61 | 2.61 | 2.61 | 2.61 |
| ODSA* | 0.48 | 0.97 | 2.90 | 4.84 | 9.69 |
| Triphenyl Phosphine | 0.49 | 0.49 | 0.49 | 0.50 | 0.49 |
| Melt Index, g/10 min @ 150° C. | 12.0 | 2.00 | 4.70 | 10.00 | 6.11 |
| $T_g$, °C. | 58.0 | 57.0 | 53.0 | 54.0 | 49.0 |

*ODSA — octadecyl succinic anhydride.

TABLE 4

| Resin | Example (weight percent) | | | |
|---|---|---|---|---|
| | N | O | P | Q |
| 3 | 94.00 | 92.05 | 87.20 | 82.36 |
| 4 | 2.90 | 4.84 | 9.69 | 14.53 |
| 5 | 2.62 | 2.62 | 2.62 | 2.62 |
| Triphenyl Phosphine | 0.48 | 0.49 | 0.49 | 0.49 |
| Melt Index, g/10 min., @ 150° C. | 16.00 | 7.00 | 12.00 | 15.60 |
| $T_g$, °C. | 60.7 | 60.6 | 61.2 | 60.4 |

TABLE 5

| Resin | Example (weight percent) | | | |
|---|---|---|---|---|
| | R | S | T | U |
| 3 | 94.00 | 92.05 | 87.20 | 82.36 |
| 4 | 2.90 | 4.84 | 9.69 | 14.53 |
| 6 | 2.62 | 2.62 | 2.62 | 2.62 |
| Triphenyl Phosphine | 0.48 | 0.49 | 0.49 | 0.49 |
| Melt Index, g/10 min., @ 150° C. | 12.4 | 6.40 | 8.70 | 11.30 |
| $T_g$, °C. | 60.7 | 60.6 | 61.2 | 60.4 |

TABLE 6

| Resin | Example (weight percent) | | | | | |
|---|---|---|---|---|---|---|
| | V | W | X | Y | Z | AA |
| 3 | 92.05 | 82.36 | 92.05 | 82.36 | 92.05 | 82.36 |
| 5 | 2.62 | 2.62 | 2.62 | 2.62 | 2.62 | 2.62 |
| 7 | 4.84 | 14.53 | | | | |
| 8 | | | 4.84 | 14.53 | | |
| 9 | | | | | 4.84 | 14.63 |
| Triphenyl Phosphine | 0.49 | 0.49 | 0.49 | 0.49 | 0.49 | 0.49 |
| Melt Index, g/10 min., @ 150° C. | 7.0 | 0.85 | — | — | 2.0 | 3.4 |
| $T_g$, °C. | 63.0 | 63.3 | 64.8 | 67.6 | 63.3 | 63.4 |

TABLE 7

| Resin | Example Weight percent | | | | |
|---|---|---|---|---|---|
| | AB | AC | AD | AE | AF |
| 3 | 73.53 | 73.53 | 74.63 | 96.9 | 96.62 |
| 5 | 1.47 | 1.47 | | 2.62 | |
| 7 | 24.5 | 24.5 | 24.87 | | |
| 8 | | | | | |
| Maleic Anhydride | | | | | 2.90 |
| Triphenyl Phosphine | 0.50 | | 0.5 | | |
| Tetraethyl Ammonium Chloride | | 0.5 | | 0.48 | 0.48 |
| Melt Index, g/10 min., @ 150° C. | 67.5 | 78.0 | 51.5 | 85.4 | 6.70 |
| $T_g$, °C. | 62.5 | 63.6 | 69.0 | 63.7 | 93.5 |

The rheological properties of the resins were determined under standard procedure in the frequency mode at 150° C. The properties are listed in Tables 8 through 13.

TABLE 8

| Frequency (Hz) | D Visc. Poise | Tan d | E Visc. Poise | Tan d | F Visc. Poise | Tan d | G Visc. Poise | Tan d | H Visc. Poise | Tan d |
|---|---|---|---|---|---|---|---|---|---|---|
| 0.01 | 7676 | 3.25 | 4148 | 15.10 | 24120 | 1.06 | 10600 | 2.83 | 19240 | 1.26 |
| 0.13 | 3701 | 1.50 | 3424 | 2.40 | 7473 | 1.11 | 5472 | 1.63 | 7450 | 1.18 |
| 1.20 | 1785 | 1.80 | 1956 | 2.40 | 3102 | 1.43 | 3064 | 1.84 | 3517 | 1.50 |
| 10.80 | 947 | 1.98 | 1151 | 2.28 | 1513 | 1.64 | 1526 | 1.86 | 1550 | 1.64 |
| 40.00 | 591 | 1.97 | 785 | 2.20 | 928 | 1.70 | 982 | 1.79 | 973 | 1.60 |

TABLE 9

| Frequency (Hz) | I Visc. Poise | Tan δ | J Visc. Poise | Tan δ | K Visc. Poise | Tan δ | L Visc. Poise | Tan δ | M Visc. Poise | Tan δ |
|---|---|---|---|---|---|---|---|---|---|---|
| 0.01 | 19570 | 1.17 | 29280 | 0.62 | 31360 | 0.62 | 33230 | 0.70 | 31860 | 0.40 |
| 0.13 | 6778 | 1.18 | 7656 | 0.85 | 7033 | 0.90 | 7053 | 0.81 | 3631 | 0.71 |
| 1.20 | 3159 | 1.44 | 2829 | 1.24 | 2158 | 1.23 | 2271 | 1.14 | 1034 | 1.05 |
| 10.80 | 1456 | 1.67 | 1321 | 1.57 | 902 | 1.51 | 852 | 1.40 | 357 | 1.43 |
| 40.00 | 849 | 1.78 | 795 | 1.79 | 562 | 1.46 | 607 | 1.42 | 231 | 1.45 |

TABLE 10

| Frequency (Hz) | N Visc. Poise | Tan δ | O Visc. Poise | Tan δ | P Visc. Poise | Tan δ | Q Visc. Poise | Tan δ |
|---|---|---|---|---|---|---|---|---|
| 0.01 | 33530 | 0.77 | 43070 | 0.59 | 36160 | 0.79 | 38300 | 0.67 |
| 0.13 | 8626 | 0.72 | 95080 | 3.23 | 9369 | 0.74 | 10020 | 0.63 |
| 1.20 | 2499 | 1.02 | 8692 | 2.00 | 2728 | 1.04 | 2670 | 0.88 |
| 10.80 | 841 | 1.34 | 3460 | 1.57 | 889 | 1.35 | 844 | 1.21 |
| 40.00 | 435 | 1.48 | 2454 | 0.74 | 465 | 1.50 | 444 | 1.41 |

TABLE 11

| Frequency (Hz) | R Visc. Poise | Tan δ | S Visc. Poise | Tan δ | T Visc. Poise | Tan δ | U Visc. Poise | Tan δ |
|---|---|---|---|---|---|---|---|---|
| 0.01 | 45530 | 0.65 | 35480 | 0.76 | 45750 | 0.63 | 29550 | 0.82 |
| 0.13 | 11540 | 0.69 | 8589 | 0.75 | 12240 | 0.60 | 7821 | 0.73 |
| 1.20 | 3282 | 0.99 | 2465 | 1.03 | 3370 | 0.88 | 2277 | 1.04 |
| 10.80 | 1088 | 1.28 | 784 | 1.34 | 1061 | 1.20 | 778 | 1.38 |
| 40.00 | 602 | 1.43 | 391 | 1.46 | 573 | 1.40 | 394 | 1.55 |

TABLE 12

| Frequency (Hz) | V Visc. Poise | Tan δ | W Visc. Poise | Tan δ | X Visc. Poise | Tan δ | Y Visc. Poise | Tan δ | Z Visc. Poise | Tan δ | AA Visc. Poise | Tan δ |
|---|---|---|---|---|---|---|---|---|---|---|---|---|
| 0.01 | 7785 | 1.06 | 8982 | 1.03 | 17410 | 1.98 | 11650 | 1.10 | 9199 | 1.55 | 9089 | 1.73 |
| 0.14 | 6670 | 1.10 | 7732 | 1.06 | 8258 | 1.10 | 11390 | 1.09 | 8153 | 1.55 | 8143 | 1.70 |
| 1.25 | 2540 | 1.45 | 3010 | 1.45 | 3492 | 1.43 | 5473 | 1.37 | 3774 | 1.74 | 3893 | 1.83 |
| 11.30 | 1016 | 1.67 | 1419 | 1.75 | 1589 | 1.52 | 2530 | 1.38 | 1796 | 1.70 | 1845 | 1.75 |
| 40.00 | 595 | 1.71 | 932 | 1.74 | 986 | 1.44 | 1547 | 1.29 | 1089 | 1.65 | 1026 | 1.90 |

TABLE 13

| Frequency (Hz) | AB Visc. Poise | Tan δ | AC Visc. Poise | Tan δ | AD Visc. Poise | Tan δ | AE Visc. Poise | Tan δ | AF Visc. Poise | Tan δ |
|---|---|---|---|---|---|---|---|---|---|---|
| 0.01 | 3831 | 2.13 | 2293 | 4.12 | 2853 | 4.65 | 1898 | 5.94 | 381600 | 0.58 |
| 0.13 | 3598 | 2.06 | 2112 | 3.74 | 2881 | 4.29 | 1798 | 5.56 | 310400 | 0.58 |
| 1.25 | 1868 | 2.59 | 1272 | 3.87 | 2401 | 4.16 | 1282 | 4.62 | 76290 | 0.61 |
| 11.30 | 1027 | 2.67 | 277 | 2.38 | 1708 | 2.65 | 892 | 3.55 | 16710 | 0.55 |
| 40.00 | 733 | 2.43 | 123 | 0.52 | 991 | 2.64 | 647 | 2.90 | 6670 | 0.50 |

That which is claimed:

1. A toner resin composition comprising:

above about 50 to 99 percent by weight of a polyester resin formed from a reaction of a polybasic acid or anhydride and at least one polyhydric alcohol, wherein said at least one polyhydric alcohol includes a bisphenol; and a polyfunctional epoxy resin crosslinked to said polyester resin, said polyfunctional epoxy resin being the reaction product of a polyfunctional halohydrin and a component selected from the group consisting of a phenol, a polyhydric phenol, a novolac resin, and mixtures thereof;

wherein said polyfunctional epoxy resin and said polyester resin have become crosslinked in the presence of a catalyst.

2. The toner resin composition according to claim 1 wherein the polybasic acid or anhydride is selected from the group consisting of maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azealic acid, malonic acid, n-dodecenylsuccinic acid, dodecylcucinic acid, octadecenylsuccinic acid, 1,2,4-benzene tricarboxylic acid, 1,3,5-benzenetricarboxylic acid, 1,2,4-cyclohexane tricarboxylic acid, 2,5,7-naphthalenetricarboxylic acid, 1,2,4-naphthalenetricarboxylic acid, 1,3,4-butanetricarboxylic acid, 1,2,5-hexanetricarboxylic acid, 1,3-dicarboxy-2-2-methyl-2-methylcarboxypropane, 1,3-dicarboxy-2-methyl-2-carboxymethylpropane, tetra(carboxymethyl)methane, 1,2,7,8-octane tetracarboxylic acid, and mixtures thereof.

3. The toner resin composition according to claim 1 wherein the at least one polyhydric alcohol further includes a component selected from the group consisting of ethylene glycol, diethylene glycol, neopentyl glycol, dipropylene glycol, polytetramethylene glycol, 1,5-pentanediol, 1,4-butanediol, 1,6-hexanediol, 1,4-cyclohexanediol, 1,4-cyclohexane dimethanol, sorbitol, 1,2,3,6-hexatetrol, 1,4-sorbitan, pentaerythritol, dipentaerythritol, tripentaerythritol, sucrose, 1,2,4-butanetroil, 1,2,5-pentanetriol, glycerol, 2-methyl propanetriol, 2-methyl 1,2,4-butane triol, trimethylol ethane, trimethylol propane, 1,3,5-trihydroxyethyl benzene, and mixtures thereof.

4. The toner resin composition according to claim 1 wherein the polybasic acid or anhydride is present in an amount ranging from about 30 to 50 percent and the polyhydric alcohol is present in an amount ranging from about 35 to 65 percent based on the weight of said polyester resin.

5. The toner resin composition according to claim 1 wherein said polyester resin is a branched polyester resin.

6. The toner resin composition according to claim 5 wherein the branched polyester resin contains alkoxy succinate segments.

7. The toner resin composition according to claim 1 wherein said catalyst is selected from the group consisting of triphenyl phosphine, tetraphenylphosphonium bromide, ethyltriphenyl phosphonium bromide, tetraphenyl phosphonium chloride, tetrabutyl phosphonium bromide, tetrabutyl phosphonium chloride, tetraethyl phosphonium bromide, tetraethyl phosphonium chloride, imidazoles, benzotriazoles, benzyltriethyl ammonium bromide, benzyltriethylammonium chloride, triethyl ammonium bromide, triethyl ammonium chloride, tributylammonium bromide, tributylammonium chloride, quaternary ammonium salts, and mixtures thereof.

8. The toner resin composition according to claim 1 further comprising a resin selected from the group consisting of a linear polyester resin, a vinyl ester resin, and an acrylate copolymer.

9. A toner resin composition comprising:

above about 50 to 99 percent by weight of a polyester resin formed from a reaction between a polybasic acid or anhydride and at least one polyhydric alcohol, wherein said at least one polyhydric alcohol includes a bisphenol; and about 0.1 to 50 percent by weight of a polyfunctional epoxy resin crosslinked to said polyester resin, said polyfunctional epoxy resin being the reaction product of a polyfunctional halohydrin and a component selected from the group consisting of a phenol, a polyhydric phenol, a novolac resin, and mixtures thereof;

wherein said polyester resin and said polyfunctional epoxy resin have become crosslinked in the presence of a catalyst selected from the group consisting of triphenyl phosphine, tetraphenyl phosphonium bromide, ethyltriphenyl phosphonium bromide, tetraphenyl phosphonium chloride, tetrabutyl phosphonium bromide, tetrabutyl phosphonium chloride, tetraethyl phosphonium bromide, tetraethyl phosphonium chloride, imidazoles, benzotriazoles, benzyltriethyl ammonium bromide, benzyltriethylammonium chloride, triethyl ammonium bromide, triethyl ammonium chloride, tributylammonium bromide, tributylammonium chloride, quaternary ammonium salts, and mixtures thereof.

10. The toner resin composition according to claim 9 wherein the polybasic acid or anhydride is selected from the group consisting of maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azealic acid, malonic acid, n-dodecenylsuccinic acid, dodecylcucinic acid, octadecenylsuccinic acid, 1,2,4-benzene tricarboxylic acid, 1,3,5-benzenetricarboxylic acid, 1,2,4-cyclohexane tricarboxylic acid, 2,5,7-naphthalenetricarboxylic acid, 1,2,4-naphthalenetricarboxylic acid, 1,3,4-butane tricarboxylic acid, 1,2,5-hexanetricarboxylic acid, 1,3-dicarboxy-2-2-methyl-2-methylcarboxypropane, 1,3-dicarboxy-2-methyl- 2-carboxymethylpropane, tetra (carboxymethyl)methane, 1,2,7,8-octane tetracarboxylic acid, and mixtures thereof.

11. The toner resin composition according to claim 10 wherein the at least one polyhydric alcohol further includes a component selected from the group consisting of ethylene glycol, diethylene glycol, neopentyl glycol, dipropylene glycol, polytetramethylene glycol, 1,5-pentanediol, 1,4-butanediol, 1,6-hexanediol, 1,4-cyclohexanediol, 1,4-cyclohexane dimethanol, sorbitol, 1,2,3,6-hexatetrol, 1,4-sorbitan, pentaerythritol, dipentaerythritol, tripentaerythritol, sucrose, 1,2,4-butanetroil, 1,2,5-pentanetriol, glycerol, 2-methyl propanetriol, 2-methyl 1,2,4-butane triol, trimethylol ethane, trimethylol propane, 1,3,5-trihydroxyethyl benzene, and mixtures thereof.

12. The toner resin composition according to claim 9 wherein the polybasic acid or anhydride is present in an amount ranging from about 30 to 50 percent and the polyhydric alcohol is present in an amount ranging from about 35 to 65 percent based on the weight of said polyester resin.

13. The toner resin composition according to claim 9 wherein said polyester resin is a branched polyester resin.

14. The toner resin composition according to claim 13 wherein the branched polyester resin contains alkoxy succinate segments.

15. The toner resin composition according to claim 9 further comprising a component selected from the group consisting of a linear polyester resin, a vinyl ester resin, and an acrylate copolymer.

16. A toner developing composition comprising:
a toner resin composition comprising from above about 50 to 99 percent by weight of a polyester resin formed from a reaction of a polybasic acid or anhydride and at least one polyhydric alcohol, wherein said at least one polyhydric alcohol includes a bisphenol and a polyfunctional epoxy resin crosslinked to said polyester resin, the polyfunctional epoxy resin being the reaction product of a polyfunctional halohydrin and a component selected from the group consisting of a phenol, a polyhydric phenol, a novolac resin, and mixtures thereof, wherein said polyfunctional epoxy resin and said polyester resin have become crosslinked in the presence of a catalyst; and
a carrier material.

17. The toner developing composition according to claim 16 wherein the polybasic acid or anhydride is selected from the group consisting of maleic acid, fumaric acid, citraconic acid, itaconic acid, glutaconic acid, phthalic acid, isophthalic acid, terephthalic acid, cyclohexane dicarboxylic acid, succinic acid, adipic acid, sebacic acid, azealic acid, malonic acid, n-dodecenylsuccinic acid, dodecylcucinic acid, octadecenylsuccinic acid, 1,2,4-benzene tricarboxylic acid, 1,3,5-benzenetricarboxylic acid, 1,2,4-cyclohexane tricarboxylic acid, 2,5,7-naphthalenetricarboxylic acid, 1,2,4-naphthalenetricarboxylic acid, 1,3,4-butanetricarboxylic acid, 1,2,5-hexanetricarboxylic acid, 1,3-dicarboxy-2-2-methyl-2-methylcarboxypropane, 1,3-dicarboxy-2-methyl-2-carboxymethylpropane, tetra(carboxymethyl)methane, 1,2,7,8-octane tetracarboxylic acid, and mixtures thereof.

18. The toner developing composition according to claim 10 wherein the at least one polyhydric alcohol further includes a component selected from the group consisting of ethylene glycol, diethylene glycol, neopentyl glycol, dipropylene glycol, polytetramethylene glycol, 1,5-pentanediol, 1,4-butanediol, 1,6-hexanediol, 1,4-cyclohexanediol, 1,4-cyclohexane dimethanol, sorbitol, 1,2,3,6-hexatetrol, 1,4-sorbitan, pentaerythritol, dipentaerythritol, tripentaerythritol, sucrose, 1,2,4-butanetroil, 1,2,5-pentanetriol, glycerol, 2-methyl propanetriol, 2-methyl 1,2,4-butane triol, trimethylol ethane, trimethylol propane, 1,3,5-trihydroxyethyl benzene, and mixtures thereof.

19. The toner developing composition according to claim 16 wherein the polybasic acid or anhydride is present in an amount ranging from about 30 to 50 percent and the polyhydric alcohol is present in an amount ranging from about 35 to 65 percent based on the weight of said polyester resin.

20. The toner developing composition according to claim 16 wherein the polyester resin is a branched polyester resin.

21. The toner developing composition according to claim 20 wherein the branched polyester resin contains alkoxy succinate segments.

22. The toner developing composition according to claim 16 wherein the catalyst is selected from the group consisting of triphenyl phosphine, tetraphenyl phosphonium bromide, ethyltriphenyl phosphonium bromide, tetraphenyl phosphonium chloride, tetrabutyl phosphonium bromide, tetrabutyl phosphonium chloride, tetraethyl phosphonium bromide, tetraethyl phosphonium chloride, imidazoles, benzotriazoles, benzyltriethyl ammonium bromide, benzyltriethylammonium chloride, triethyl ammonium bromide, triethyl ammonium chloride, tributylammonium bromide, tributylammonium chloride, quaternary ammonium salts, and mixtures thereof.

23. The toner resin composition according to claim 16 wherein said carrier material is selected from the group consisting of iron, nickel, cobalt, zinc, antimony, aluminum, lead, tin, bismuth, beryllium, manganese, selenium, tungsten, zirconium, vanadium, alloys thereof, and mixtures thereof.

24. The toner resin composition according to claim 16 wherein said carrier material is selected from the group consisting of iron oxide, titanium oxide, magnesium oxide, chromium nitride, vanadium nitride, silicon carbide, tungsten carbide, alloys thereof, and mixtures thereof.

25. A process for making a toner resin composition which comprises:
providing from above about 50 to 99 percent by weight of a polyester resin formed from a reaction between a polybasic acid or anhydride and at least one polyhydric alcohol, wherein said at least one polyhydric alcohol includes a bisphenol, a polyfunctional epoxy resin which is the reaction product of a polyfunctional halohydrin and a component selected from the group consisting of a phenol, a polyhydric phenol, a novolac resin, and mixtures thereof, and a catalyst; and
reacting the polyester resin and the polyfunctional epoxy resin in the presence of the catalyst such that the polyester resin and the polyfunctional epoxy resin become crosslinked.

26. The process according to claim 25 wherein said step of reacting the polyester resin and the polyfunctional epoxy resin takes place between about 10 and 300 seconds.

27. The process according to claim 25 wherein said steps of providing and reacting the polyester resin and the polyfunctional epoxy resin occur in an extruder; and further comprising discharging the toner resin composition from the extruder.

28. The process according to claim 25 wherein the catalyst is selected from the group consisting of triphenyl phosphine, tetraphenyl phosphonium bromide, ethyltriphenyl phosphonium bromide, tetraphenyl phosphonium chloride, tetrabutyl phosphonium bromide, tetrabutyl phosphonium chloride, tetraethyl phosphonium bromide, tetraethyl phosphonium chloride, imidazoles, benzotriazoles, benzyltriethyl ammonium bromide, benzyltriethylammonium chloride. triethyl ammonium bromide. triethyl ammonium chloride. tributylammonium bromide. tributylammonium chloride. quaternary ammonium salts, and mixtures thereof.

29. The process according to claim 25 wherein said step of providing a polyester resin and a polyfunctional epoxy resin comprises providing an additional component selected from the group consisting of a linear polyester resin. a vinyl ester resin, and an acrylate copolymer.

30. The process according to claim 25 further comprising the step of mixing the toner resin composition with a carrier material to form a toner developing composition.

31. A toner resin composition comprising:
above about 50 to 99 percent by weight of a polyester resin formed from a reaction of a polybasic acid or anhydride and at least one polyhydric alcohol, wherein said at least one polyhydric alcohol includes a bisphenol; and
a polyfunctional epoxy resin crosslinked to said polyester resin, wherein the polyfunctional epoxy resin is the reaction product of a polyfunctional halohydrin and a component selected from the group consisting of a phenol, a polyhydric phenol, a novolac resin, and mixtures thereof, and wherein said polyfunctional epoxy resin is an epoxy acrylate resin;
wherein said polyfunctional epoxy resin and said polyester resin have become crosslinked in the presence of a catalyst.

32. The toner resin composition according to claim 1 wherein the bisphenol is selected from the group consisting of bispolyoxypropylene (2.2)-2.2-bis (4-hydroxyphenyl) propane. polyoxypropylene (3.3)-2.2-bis (4-hydroxyphenyl) propane. polyoxy ethylene (2.0)-2.2-bis (4-hydroxyphenyl) propane. and polyoxypropylene (2.0)-polyoxypropylene (6)-2.2-bis (4-hydroxy phenyl) propane.

33. The toner resin composition according to claim 9 wherein the bisphenol is selected from the group consisting of bispolyoxypropylene (2.2)-2.2-bis (4-hydroxyphenyl) propane. polyoxypropylene (3.3)-2.2-bis (4-hydroxyphenyl) propane. polyoxy ethylene (2.0)-2.2-bis (4-hydroxyphenyl) propane. and polyoxypropylene (2.0)-polyoxypropylene (6)-2.2-bis (4-hydroxy phenyl) propane.

34. The toner developing composition according to claim 16 wherein the bisphenol is selected from the group consisting of bispolyoxypropylene (2.2) -2.2-bis (4-hydroxyphenyl) propane. polyoxypropylene (3.3)-2.2-bis (4-hydroxyphenyl) propane. polyoxy ethylene (2.0)-2.2-bis (4-hydroxyphenyl) propane, and polyoxypropylene (2.0)-polyoxypropylene (6)-2.2-bis (4-hydroxy phenyl) propane.

35. The toner resin composition according to claim 31 wherein the bisphenol is selected from the group consisting of bispolyoxypropylene (2.2)-2.2-bis (4-hydroxyphenyl) propane. polyoxypropylene (3.3)-2.2-bis (4-hydroxyphenyl) propane. polyoxy ethylene (2.0)-2.2-bis (4-hydroxyphenyl) propane. and polyoxypropylene (2.0)-polyoxypropylene (6)-2.2-bis (4-hydroxy phenyl) propane.

* * * * *